US006999832B2

(12) United States Patent
Haller et al.

(10) Patent No.: US 6,999,832 B2
(45) Date of Patent: Feb. 14, 2006

(54) PRODUCTION MACHINE WITH CAPABILITY OF TRANSMITTING PRODUCTION INFORMATION AND METHOD FOR GENERATING EVENTS REGARDING PRODUCTION INFORMATION WHILE OPERATING THE PRODUCTION MACHINE

(75) Inventors: Martin Haller, Berlin (DE); Norbert Haueis, Kareth (DE); Arieh Greenberg, Rohrdor (DE)

(73) Assignee: Infineon Technologies AG, Munich (DE)

( * ) Notice: Subject to any disclaimer, the term of this patent is extended or adjusted under 35 U.S.C. 154(b) by 471 days.

(21) Appl. No.: 10/139,167

(22) Filed: May 6, 2002

(65) Prior Publication Data

US 2003/0033042 A1 Feb. 13, 2003

(30) Foreign Application Priority Data

May 4, 2001 (DE) .............................. 101 21 729

(51) Int. Cl.
*G06F 17/40* (2006.01)
(52) U.S. Cl. ...................... 700/108; 700/14; 700/174; 700/258; 700/159; 700/163; 700/84; 702/176; 702/178; 702/187
(58) Field of Classification Search ................ 700/258, 700/159, 163, 83, 84, 12, 14, 27, 51, 52, 700/78, 96, 108, 117, 174; 702/187, 176–178, 702/188
See application file for complete search history.

(56) References Cited

U.S. PATENT DOCUMENTS

| 5,091,859 A | * | 2/1992 | Zingher et al. ............. 700/117 |
| 5,295,062 A | | 3/1994 | Fukushima ................... 700/83 |
| 5,446,672 A | * | 8/1995 | Boldys ........................ 700/174 |
| 5,573,457 A | | 11/1996 | Watts et al. .................. 453/31 |

FOREIGN PATENT DOCUMENTS

GB 2 355 092 A 4/2001

(Continued)

OTHER PUBLICATIONS

Perkett, W. "Real Time Factory Monitoring System", Nov. 1994, article appears in Advance Semiconductor Manufacturing Conference and Workshop. 1994. ASMC 94. Proceedings. IEEE/SEMI. pp 261-266.*

(Continued)

*Primary Examiner*—Anthony Knight
*Assistant Examiner*—Thomas Pham
(74) *Attorney, Agent, or Firm*—Laurence A. Greenberg; Werner H. Stemer; Ralph E. Locher

(57) ABSTRACT

A production machine has at least one signal output with the capability of transmitting production status information to a production control system or production monitoring system. Signal outputs of the production machine are picked up and the statuses of the signal outputs are passed on via data connections to an operator console. The product status information obtained in this way is transmitted together with the information input manually by an operator via a data connection to a computer system for evaluation. A method generates events regarding production information while the production machine is operating.

18 Claims, 6 Drawing Sheets

U.S. PATENT DOCUMENTS

| | | | |
|---|---|---|---|
| 5,631,825 A * | 5/1997 | van Weele et al. | 700/83 |
| 5,696,702 A * | 12/1997 | Skinner et al. | 702/186 |
| 5,870,696 A * | 2/1999 | Randolph | 702/176 |
| 6,128,543 A * | 10/2000 | Hitchner | 700/108 |
| 6,356,859 B1 * | 3/2002 | Talbot et al. | 702/188 |
| 6,463,360 B1 * | 10/2002 | Terada et al. | 700/257 |
| 6,690,985 B1 * | 2/2004 | Haller et al. | 700/108 |
| 2002/0026263 A1 * | 2/2002 | Matsumoto | 700/174 |

FOREIGN PATENT DOCUMENTS

| | | |
|---|---|---|
| WO | WO 93/11475 | 6/1993 |
| WO | WO 99/27428 | 6/1999 |

OTHER PUBLICATIONS

Tokuda, Hideyuki; Kotera, Makoto; Mercer, Clifford, "A real time Monitoring for Distributed Real-Time Operating System" 1988, ACM Press, pp. 68-77.*

* cited by examiner

PRODUCTION MACHINE WITH
CAPABILITY OF TRANSMITTING
PRODUCTION INFORMATION AND
METHOD FOR GENERATING EVENTS
REGARDING PRODUCTION INFORMATION
WHILE OPERATING THE PRODUCTION
MACHINE

BACKGROUND OF THE INVENTION

Field of the Invention

The invention relates to a production machine with at least one signal output with the capability of transmitting production status information, it being possible for the production status information to be generated in accordance with events picked up automatically on the production machine and with manual inputs of an operator.

In the case of customary production machines which have no interface for transmitting production status information to a production control system or production monitoring system, production status information can often only be registered by inputs of an operator via a terminal or via a keypad. Signal outputs of the production machines, which represent potential data sources for establishing the exact production status of the production machine, are used only rarely or only inadequately.

In the case of these known methods it is disadvantageous that the exclusive registration of manual inputs of the operator for generating production status information of the production machine and incomplete use of the existing signal outputs of the production machine as data sources for determining production status information mean that the production status of the production machine can only be registered inadequately.

Manual inputs of the operator provide only limited information on the production status of the production machine.

SUMMARY OF THE INVENTION

The invention is based on the object of providing a production machine in which more accurate production information is obtained.

This object is achieved by the subject matter of the independent claims. Advantageous developments emerge from the respective dependent claims.

The production machine according to the invention automatically picks up all the signal outputs of the production machine and generates from the picked-up data of the signal outputs of the production machine events which can be used for generating production status information of the production machine. Furthermore, the production machine uses manual inputs of an operator which can be made via a keypad, via a terminal or via similar input media.

The picking-up of the signal outputs of the production machine according to the invention and the combining of the information obtained in this way with the manual user inputs allows very accurate and very extensive information on the operating statuses of the production machine to be obtained. The picking-up of the signal outputs according to the invention and the combining of the data generated in this way with the manual inputs of an operator according to the invention are independent of the type of production machine. The generation of production information according to the invention can be used very simply and at very low cost for many production machines.

The manual inputs of the user can be provided via a keypad or via a switch array. In the case of a keypad, the input of production information takes place via a number of keys provided with inscriptions. If keys are used, it is often not possible to obtain information on the respective status of the key from a position of the keys. Rather, if keys are used, electrical light signals are often provided for the individual keys in order to represent the respective status of the key. If a switch array is used, it is possible to conclude from the position of the switch the respective status of the corresponding switch. In addition, light signals may be provided for representing statuses assigned to individual switches.

Many different keypads and switch arrays for generating production information from manual inputs of a user are available on the market. The invention can be used in a wide variety of ways and can be adapted very simply to various keypads and various switch arrays.

In one embodiment of the invention, the production machine is connected via a data connection to a touch-sensitive screen or a touchscreen for the manual input of production information by an operator, from which events for generating production information can be picked up.

The accuracy of the production information generated can be further improved in this way since, on this touch-sensitive screen, the areas for manual input can be allocated in a user-defined manner and additional information, for example information on batches produced, can be input by the user.

Furthermore, it is possible according to invention to transmit manual signals of the touch-sensitive screen to the production machine and to parts of the production machine to control or correct components of the production machines, such as for example the signal lamps. This allows the accuracy of the signals which can be picked up from the production machine to be increased significantly.

According to a further embodiment of the invention, sensors of the production machine, in particular sensors for determining the filling status of buffer zones, sensors for measuring pressure and indexers for measuring work progress, are used for generating production information. For this, electrical signals are picked up from the sensors.

The invention can be used in a wide variety of ways and can be adapted very simply to various sensors. The use of sensors for generating production information allows the accuracy of the production information generated to be further increased.

According to a further embodiment of the invention, the machine control of the production machine is used for generating production information. According to the invention, the signal lamps of the production machine are intended in particular for generating production information. In this case, electrical signals are picked up from the machine control of the production machine or the signal lamps of the production machine. The accuracy of the production information generated can be further increased in this way.

According to one configuration of the invention, the keypad or the switch array or the touch-sensitive screen and/or the sensors of the production machine, in particular sensors for determining the filling status of buffer zones, sensors for measuring pressure and indexers for measuring work progress, and/or the machine control of the production machine, in particular the signal lamps of the production machine, can be used for generating events in the case of a method for operating a production machine. In the case of this method, production information, in particular with respect to the capacity utilization and/or with respect to the reliability and/or with respect to the availability of the production machine, can be generated.

For this, in a step of setting up an interpretation status model, the transitions between statuses of the interpretation status model are established in accordance with the events which can be picked up on the production machine. Furthermore, the step of assigning statuses of the interpretation status model to statuses of the evaluation status model is provided.

The use of a keypad or switch array or touch-sensitive screen allows a particularly fine breakdown of the evaluation status model to take place, it being possible for the time periods in which the production machine is in the evaluation status concerned to be assigned particularly accurately by the inclusion of manual inputs.

This configuration of the invention allows information which can be manually input to be used for the assignment according to the invention of evaluation statuses which cannot be included in the assignment when only an evaluation status model is being used.

The invention also relates to a method of operating a production machine in which production information, in particular with respect to the capacity utilization, with respect to the reliability and/or with respect to the availability of the production machine, can be generated.

Methods for generating such production information in which evaluation statuses are assigned to a production machine are conceivable. In this case, an operator of the production machine has to switch back and forth between the various evaluation statuses. Depending on which evaluation status the production machine is in, an amount of time which corresponds to the time period in which the production machine is in the evaluation status concerned is credited to a time account assigned to the evaluation status. At the end of a production cycle, the counter readings of the various time accounts can be inquired. The productivity of the production machine is then obtained as a quotient of the amount of the time account, which corresponds to the production status of the production machine, and the overall running time of the production machine.

In the case of such a method, it is disadvantageous that manual inputs of an operator of the production machine are required for the transition between various evaluation statuses. Such manual inputs are often forgotten or even intentionally made incorrectly to make the production result look better.

According to an adaptive procedure, it is also conceivable for the transitions between various evaluation statuses to be undertaken in accordance with events which are picked up on the production machine. Many production machines are provided with status lamps, which switch back and forth between "red", "green", "yellow" and "red+yellow", depending on the operating status of the production machine. It is consequently conceivable for an evaluation status of "processing" and another evaluation status of "no processing" to be established, operating times of the production machine then being credited to a time account assigned to the evaluation status of "processing" when the status lamp is in the "green" status. Times are credited to the other time account, for the evaluation status of "no production", when the status indicator is in the "red", "yellow" or "red+yellow" statuses.

In the case of this adaptive procedure, it is advantageous that the automated registering of events allows an operator-independent crediting of time periods to the time accounts to be performed. Incorrect inputs are ruled out in this case.

However, in the case of such adaptive methods, it is disadvantageous that the production information obtained is very inaccurate.

The provision according to the invention of an additional interpretation status model of the production machine advantageously allows these events to be used to assign time periods in which the production machine is in certain statuses accurately to the correct evaluation status. As a result, the accuracy of the generation of production information is improved considerably.

The method according to the invention has the step of setting up an interpretation status model. In this case, transitions between statuses of the interpretation status model are established in accordance with the events which can be picked up on the production machine. Furthermore, the step of assigning statuses of the interpretation status model to statuses of the evaluation status model is provided.

Unlike in the case of the known methods, in the case of the procedure according to the invention a particularly fine breakdown of the evaluation status model can be performed, it being possible for the time periods in which the production machine is in the evaluation status concerned to be assigned particularly accurately.

In this case, events which cannot be included in the assignment when only an evaluation status model is being used can also advantageously be picked up on the production machine, in particular at the keypad or switch array or at the touch-sensitive screen and/or at the sensors, in particular at the sensors for determining the filling status of buffer zones, at the sensors for measuring pressure and at the indexers for measuring work progress and/or at the machine control of the production machine or at the signal lamps, and used for the assignment according to the invention. The provision according to the invention of an additional interpretation status model of the production machine advantageously allows these events to be used to assign time periods in which the production machine is in certain statuses accurately to the correct evaluation status. As a result, the accuracy of the generation of production information is improved considerably.

In an advantageous development of the invention, when setting up the interpretation status model, transitions between the statuses are established in accordance with inputs of an operator of the production machine. The manual inputs of the operator of the production machine are in this case performed on the keypad, on a terminal, on a standard keyboard or on the touch-sensitive screen or touchscreen and are picked up from there.

If such inputs are provided as events which correspond to transitions between statuses of the interpretation status model, the accuracy of the production information generated according to the invention can be increased considerably. This is because it is not possible in the case of many production machines for all the statuses of the production machine to be established just on the basis of events which can be picked up in an automated manner on the production machine itself. For example, it is possible with additional inputs of an operator to distinguish between operation of a production machine in a test phase and operation of the same production machine in a production phase. The manual inputs of the operator can in this case be described by a status model and can be used as events of the interpretation status model.

According to the invention, both operator inputs and events automatically picked up on the production machine are used for a determination of the operating status of the production machine applicable at a particular time. The operating status can be derived by using the operator inputs and the automatically picked-up events from the interpretation status model of the production machine and can be accurately assigned to a corresponding main status of the evaluation status model. The respectively applicable main status of the production machine is accordingly dependent on the type and sequence of the events of the production machine that have occurred and on their interpretation and prioritizing according to the main status of the interpretation status model.

This allows a further increase in the accuracy of the generated production information to be achieved.

According to a further advantageous configuration of the invention, signals can be picked up from sensors, in particular from buffer sensors, from pressure sensors and from indexers of the production machine. These signals can be used as events in the interpretation status model in order to improve further the accuracy of the assignment of time periods in which the production machine is in certain operating statuses to the correct evaluation status. In this case, the signals of the sensors can assume discrete statuses and be described by a sensor status model.

According to the invention, the information generated from the statuses of the sensors is advantageously used to assign time periods in which production machines are in certain statuses accurately to the correct evaluation status. A particularly fine breakdown of the evaluation statuses is made possible in this way.

In a further embodiment of the invention, signals are picked up from the machine control, in particular the signal lamps, of the production machine for generating production information. In this way, the operating statuses of the machine control or of the signal lamps can be described by a status model or by a signal lamp status model. The statuses of the machine control or of the signal lamps can be used as events in the interpretation status model.

In the case of existing production machines, the signal lamps often serve exclusively for visually checking the operating status of the production machine in the production line. According to the invention, the information obtained from the statuses of the signal lamps is advantageously used to assign time periods in which the production machines are in certain statuses accurately to the correct evaluation status. A particularly fine breakdown of the evaluation statuses is possible in this way.

The picking-up of signal outputs of the production machine according to the invention and the inclusion of manual inputs by an operator of the production machine are advantageous in particular whenever it is intended to register the operating statuses of an older production machine or older production line which has neither an online connection nor an interface to a master computer and for which no great financial investment is to be made in software and hardware.

The obtainment of production information according to the invention allows evaluation statuses to be further detailed.

Bottlenecks in the production line can be clearly identified.

The signals picked up automatically from the machine components and the information input by an operator are evaluated by a specially developed algorithm. According to the invention, the software tool "Online Machine Engineering" or "OME" is provided for this. This is subdivided into the "Production Status Control" module or "PSC" module and the "Online Machine Engineering" module or "OME" module.

The data picked up from the machine components of the production machine and the data input by the operator of the production machine are brought together in the operator console and passed on via a data connection to a signal converter. In the signal converter, a number of production machines can be brought together in a standardized manner, so that they can be passed on via a bus connection to a monitoring system.

The status models of the individual data sources of the production machine can only provide qualified information on the production status of the production machine. To register the status of the production machine correctly and as completely as possible, according to the invention a combination of data sources is used. Moreover, the invention supports parallel use of different data sources.

The signal lamps are particularly suitable for registering the production status of the production machine. However, these lamps often do not correspond to the statuses which are required for an evaluation according to the evaluation status model. Moreover, they do not provide information when the production machine is switched off.

According to the invention, the status model of the operator panel is defined as the main status model. This has the effect that the status of the machine is only determined by means of the electrical signals when the manual input on the keypad prescribes "operation".

The invention allows a wide variety of machine components of production machines to be used for obtaining data. The invention permits not only use of production machines and machine components of production machines which conform to the "Semiconductor Equipment and Materials International Equipment Communications Standard/Generic Equipment Model" Standard or the "SECS/GM" Standard but also use of machines or machine components with proprietary interfaces and use of production machines which have no interface.

According to the invention, different connections can be established between the machine components of the production machines and the software for monitoring and analysis.

The parameters supported by the invention are operating statuses, calculated performance parameters, such as "Overall Equipment Effectiveness" or "OEE" or "Mean Time Between Failure" or "MTBF", process parameters, such as pressure or temperature, product parameters, such as the device or the housing, and additionally further influencing factors, such as the operator of the production machine or shift parameters.

The "TFM" software used provides a graphic instrument for modeling statuses which makes it possible for information to be presented in a way in which it is broken down between various data sources.

According to the invention, production information can be called up by the user in real time via the network, in the form of real-time graphics and summarizing reports. Likewise, production information can be exported into other systems.

According to the invention, data of any desired data sources can be brought together and interpreted in a freely configurable way. This allows individual production machines and entire production lines to be compared with one another, for example to improve them on the basis of the "Golden Tool" principle.

Individual data sources can be assigned different priorities. For example, manual inputs can be given preference over automated data.

The production information generated according to the invention can be used for online monitoring and for offline reporting.

The technical implementation can take place by means of the "Online Machine Engineering" or "OME" software package and by means of the "Production Status Control" module or "PSC" module.

The invention is illustrated in more detail in the drawings on the basis of two exemplary embodiments.

DESCRIPTION OF THE PREFERRED EMBODIMENTS

Figure 1:
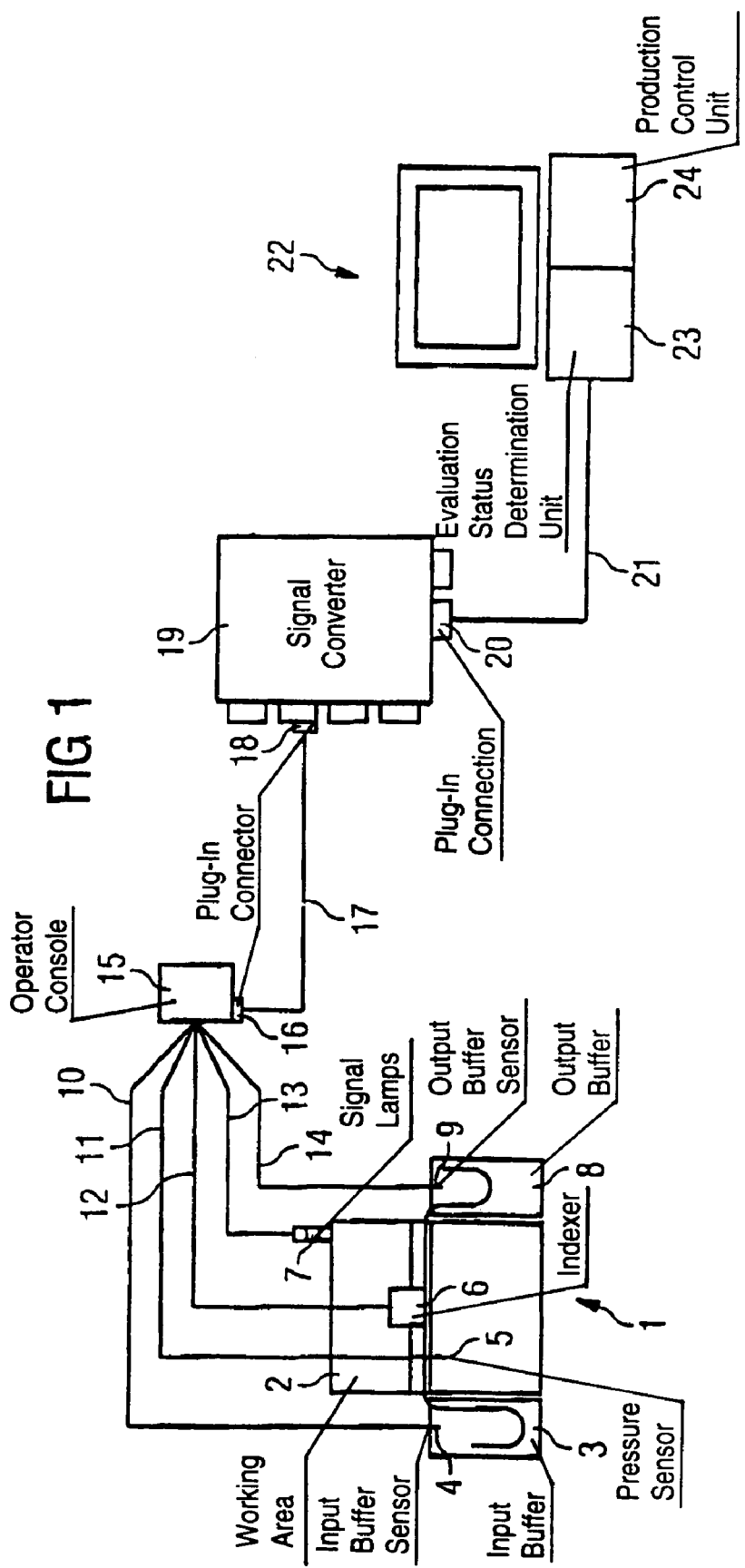
FIG. 1 shows a schematic representation of a wiring machine or a first wire bonder, a first data connection, a second data connection, a third data connection, a fourth data connection, a fifth data connection, an operator console, a first plug-in connection, a data transmission cable, a second plug-in connection, a first signal converter, a third plug-in connection, a first bus connection and a computer system according to a first exemplary embodiment.

FIG. 1 shows a schematic representation of a wiring machine or a first wire bonder 1, a first data connection 10, a second data connection 11, a third data connection 12, a fourth data connection 13, a fifth data connection 14, an operator console 15, a first plug-in connection 16, a data transmission cable 17, a second plug-in connection 18, a first signal converter 19, a third plug-in connection 20, a first bus connection 21 and a computer system 22 according to a first exemplary embodiment.

The first wire bonder 1 is divided into a first working area 2, a first input buffer 3, a first input buffer sensor 4, a pressure sensor 5, an indexer 6, first signal lamps 7, a first output buffer 8 and a first output buffer sensor 9.

The first wire bonder 1 is part of a semiconductor production line. The first wire bonder 1 is intended for processing semiconductor substrates not shown here. For this purpose, in the first working area 2 the first wire bonder 1 wires the electrical connections of the modules which have been applied to the semiconductor substrates by a machine not shown here of the semiconductor production line arranged upstream of the first wire bonder 1.

The semiconductor substrates pass via the first input buffer 3 into the first working area 2 of the first wire bonder 1. In the first working area 2, the wiring of the connections of the modules of the semiconductor substrates takes place. Once wiring has taken place, the semiconductor substrates are deposited in the first output buffer 8 and then passed on to a next machine not shown here of the semiconductor production line.

For determining and checking the operating statuses of the first wire bonder 1, the first input buffer sensor 4, the pressure sensor 5, the indexer 6, the first signal lamps 7 and the first output buffer sensor 9 are available as data sources.

The first input buffer 3 and the first output buffer 8 are respectively intended for receiving a limited number of semiconductor substrates.

Deposited in the first input buffer 3 are semiconductor substrates which are intended for processing in the first working area 2 of the first wire bonder 1. The first input buffer 3 is equipped with the first input buffer sensor 4, which establishes the filling status of the first input buffer 3. The signals of the first input buffer sensor 4 are electrically picked up and transmitted via the first data connection 10 to the operator console 15.

The pressure sensor 5 indicates the pressure prevailing in the first working area 2 of the first wire bonder 1 in the form of sensor signals. The signals of the pressure sensor 5 are electrically picked up and transmitted via the second data connection 11 to the operator console 15.

The indexer 6 in the first working area 2 records the progress of work in the first working area 2 of the first wire bonder 1 and passes this on in the form of signals, which are electrically picked up, via the third data connection 12 to the operator console 15.

The first signal lamps 7 have a green light, a yellow light and a red light. These signal the technical status of the first wire bonder 1. The statuses of the first signal lamps 7 can be electrically picked up and passed on via the fourth data connection 13 to the operator console 15.

The first output buffer 8 has the first output buffer sensor 9. Deposited in the first output buffer 8 are semiconductor substrates which have been processed in the first working area 2 of the first wire bonder 1 and are intended for passing on to a next machine not shown here of the semiconductor production line. The first output buffer sensor 9 shows the filling status of the first output buffer 8. The signals of the first output buffer sensor 9 are electrically picked up and passed on via the fifth data connection 14 to the operator console 15.

The operator console 15 is intended for bringing together electrically picked-up signals of the first input buffer sensor 4, the pressure sensor 5, the indexer 6, the first signal lamps 7 and the first output buffer sensor 9 and further production machines not shown here and also for receiving manual inputs by a user.

Figure 2:
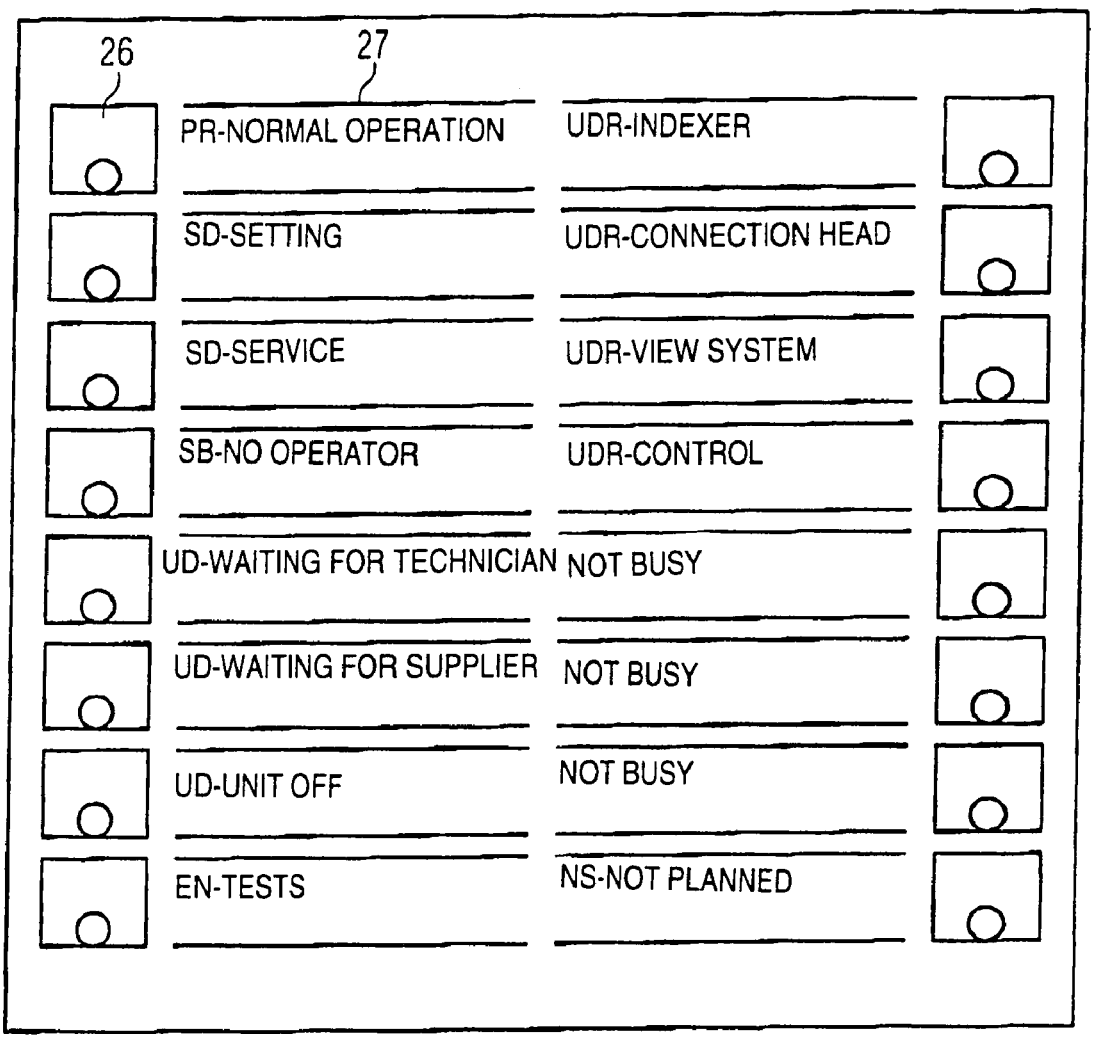
FIG. 2 shows a schematic representation of a first operator console keypad of the operator console shown in FIG. 1 according to the first exemplary embodiment.

The operator console 15 has a first operator console keypad 25 for receiving manual inputs by a user, which is described in FIG. 2.

The data brought together in the operator console 15 are passed on via a first plug-in connection 16, via a data transmission cable 17 and via a second plug-in connection 18 to the first signal converter 19. The first plug-in connection 16, the second plug-in connection 18, the third plug-in connection 20 and all further plug-in connections are provided as plug-in connections with 25 pins or 25 contact pins.

According to the invention, the female parts of the sockets of the plug-in connections are respectively provided on the cable side or bus connection side. The male part of the socket of the plug-in connection is respectively provided on the side of the operator console 15 and on the side of the first signal converter 19.

The data transmission cable 17 and all further data transmission cables not shown here are provided as 25-wire cables in each case.

The assignment of the 25 pins or the 25 contact pins and the assignment of the 25 wires of the data transmission cables correspond to one another.

According to the invention, the operator console 15 is provided in a resistant housing and can be flexibly mounted on the production machine. The operator console 15 has in each case an input and an output, which are respectively provided as 25-pin or 25-contact-pin plug-in connectors. The operator console 15 is supplied with a voltage of 24 V via the data transmission cable 17 by the first signal converter 19.

According to the first exemplary embodiment, the voltage for supplying the operator console 15 is available on the 25th contact pin of the first plug-in connection 16 and the second plug-in connection 18 and accordingly on the 25th wire of the 25-wire data transmission cable 17.

On the operator console 15, the keys respectively pressed are detected and converted into a binary signal. On the operator console 15 there are altogether 16 keys, which can in each case assume the statuses "on" and "off". These statuses are binary-coded and passed on as an electrical signal via the first plug-in connection 16, via the data transmission cable 17 and via the second plug-in connection 18 to the first signal converter 19.

The electrical signals of the first input buffer sensor 4, the pressure sensor 4, the indexer 6, the first signal lamps 7 and the first output buffer 8 are transmitted in the first exemplary embodiment with a voltage of 24 V to the operator console 15. In the case of production machines and machine components of production machines of which the electrical signals are transmitted with another voltage, the conversion of the voltage of the electrical signals to 24 V takes place in the operator console 15. Electrical isolation is provided by the operator console 15.

The electrical signals of the machine components and the electrically coded manual inputs are respectively assigned to corresponding line wires of the data transmission cable and respectively corresponding contact pins of the plug-in connections.

To assist understanding, the line wires and the associated contact pins are referred to hereafter as pins.

According to the invention, signals are transmitted via the first data connection 10, via the second data connection 11, via the third data connection 12, via the fourth data connection 13 and via the fifth data connection 14 to the operator console 15. This side, facing the first wire bonder 1 and all the further production machines not shown here, is referred to hereafter as the input side.

Both the data transmitted from the first wire bonder 1 and from all further production machines not shown here and the data input by the operator into the operator console 15 are passed on from the operator console 15 via the first plug-in connection 16, via the data transmission cable 17 and via the second plug-in connection 18 to the first signal converter 19. The side of the operator console 15 facing the first signal converter 19 is referred to hereafter as the output side.

According to the invention, the assignment of the 25 pins of the input side is provided in such a way that, on the pins 1–8, the main signals are transmitted by a voltage in the range from 0 to 24 V. The pins 9–12, which are intended for manual inputs, are not assigned on the input side. The pins 13–18 are intended on the input side for the transmission of machine malfunctions. These are transmitted by a voltage in the range from 0 to 24 V. On the pins 19–22, additional signals are provided in the voltage range from 0 to 24 V for a transmission. The 23rd pin can be used for grounding the production machine. The 24th and 25th pins are not used on the input side.

On the output side of the operator console 15, the pins 1–8 are intended for the transmission of main signals, the pins 9–12 are intended for the transmission of binary-coded manual inputs, the pins 13–18 are intended for machine malfunctions and the pins 19–22 are intended for additional signals. The voltage present for the transmission of the signals on the pins 1–22 is in each case 24 V. The 23rd pin is used for grounding the production machine. The 24th pin is not used. The 25th pin is intended for the voltage supply.

According to the first exemplary embodiment of the invention, the first pin is intended for the transmission of the signal of the red light of the first signal lamps 7 both on the input side and on the output side. The second pin is intended on the input side and on the output side for the transmission of the signal of the green light of the first signal lamps 7. The 3rd pin is intended on the input side and on the output side for the transmission of the signal of the yellow light of the first signal lamps 7. All combinations of the statuses of the first signal lamps 7 can be represented by the signals transmitted on the pins 1–3.

On the 4th pin, both on the input side and on the output side, the status of the first input buffer 3 is transmitted. In this case, the statuses of "first input buffer empty" and "first input buffer not empty" are available. On the fifth pin, the signal of the first output buffer 8 is transmitted. In this case, the statuses of "first output buffer full" and "first output buffer not full" are possible.

On the input side, the pins 9–12 are not assigned, on the output side the binary-coded manual inputs of the first operator console keypad 25 are transmitted on the pins 9–12. Altogether, 16 different keys with two statuses each can be transmitted in coded form.

On the 13th pin, the signal of the pressure sensor 5 both on the input side and on the output side is transmitted. In this case, the statuses of "no pressure" and "pressure OK" are possible.

On the pins 19–22, additional signals can be transmitted. These are provided both on the input side and on the output side.

The 23rd pin is used on the input side and on the output side for grounding.

The pins 6–8, 14–18 and 24 are not used for signal or voltage transmission on either the input side or the output side. The 25th pin is not used on the input side. On the output side, the 25th pin is intended for supplying the operator console 15 with voltage by the first signal converter 19. In this case, the statuses of "supply" and "no supply" are possible.

The first signal converter 19 represents the interface between the data of the first wire bonder 1 and all further production machines not shown here transmitted via the data transmission cable 17 and the first bus connection 21 to the computer system 22. According to the first exemplary embodiment, the first signal converter 19 takes the form of an "ET 200" or a component of a similar construction.

At the first signal converter 19, all the electrical connections, such as the power supply, the first bus connection 21, in particular a customary industrial bus connection, and the data transmission cable can be externally connected as connection cables with standardized 25-pin connectors. The signals of the first wire bonder 1 are transmitted from the operator console 15 in binary-coded form.

The first signal converter 19 is configured as a box. According to the first exemplary embodiment 16, it provides input plug-in connections for 16 individual production machines. A different number of input plug-in connections may also be provided, in accordance with the modules installed in the first signal converter 19.

16 data transmission channels are respectively provided for each connectable production machine.

Up to 32 different signal converters can be connected to the computer system 22 via the first bus connection 21, in particular a customary industrial bus connection.

The first signal converter 19 performs not only a transmission of the data of the production machines and the power supply of the operator console 19 but also grounding.

The internal wiring of the first signal converter 19 provides the connections of the pins in such a way that the main signals of the production machines are respectively transmitted on the pins 1–16 by means of a voltage which lies in the range between 0 and +24 V. The pins 17–23 are not used according to the first exemplary embodiment; on the pin 24, a power supply is provided with 24 V by the first signal converter 19 for the operator console 15. The 25th pin is intended for grounding.

One production machine or one operator console keypad is respectively connected by a data transmission cable to the first signal converter 19. According to the first exemplary embodiment, only signals which have a voltage of 24 V are used. Identical grounding is used for all the signals. For this, according to the first exemplary embodiment of the invention, all the signals are decoupled on the side of the production machines. The voltage supply necessary for this is provided by the first signal converter 19 by means of a supplied voltage of 24 V. The voltage supply of the first signal converter 19 is rated at a voltage of 220 V.

The data of the first wire bonder 1 and all further production machines not considered here are transmitted via the first bus connection 21, preferably via a customary industrial bus connection, from the first signal converter 19 to the computer system 22.

The computer system 22 is divided into a unit for evaluation status determination 23 and a production control unit 24.

In the unit for evaluation status determination 23, the data of all the transmission channels of in each case one production machine are registered and used for the purpose of determining the evaluation status of the machine. A special software module is used for this. The various statuses of the respective machine components are indicated on a transmission channel by the electrical signals "on", "off" or "flashing with a certain frequency".

Various transmission channels can be connected to one another and interpreted as a status model. Accordingly, the changing of a specific signal of a transmission channel can be assigned to a machine component in the context of a status model.

For example, the first signal lamps 7 have three different transmission channels, to be precise a transmission channel for the green light of the first signal lamps 7, a transmission channel for the yellow light of the first signal lamps 7 and a further transmission channel for the red light of the first signal lamps 7.

According to the first exemplary embodiment, these items of information are combined by logic operations. In the case of the electrical signals "red on", "green off" and "yellow off", an event "1100" is sent. Here, the first "1" stands for the context and the numerical sequence "100" stands for the present operating status of the first signal lamps 7. If the input signal of the first signal lamps 7 changes to "red off", "green off" and "yellow flashing", an event "1002" is accordingly produced.

In this way, various signals of the transmission channels can be differentiated by the software and different relationships can be presented.

The statuses of the respective machine components transmitted by means of the electrical signals are used as events in the interpretation status model of the production machine. Accordingly, the respective operating statuses of the production machine can be determined according to the evaluation model from the operating statuses of the machine components.

The production information of the production machines determined in the unit for evaluation status determination 23 by means of the suitable software is used in the production control unit 24 for monitoring and controlling the first wire bonder 1 and further machines not shown here of the semiconductor production line.

FIG. 2 shows a first operator console keypad 25 of the operator console 15 shown in FIG. 1.

The first operator console keypad 25 has a first key 26 with a first key inscription 27 and altogether 15 further keys with a respectively corresponding key inscription. The first operator console keypad 25 can be provided as a commercially available keypad, for example as a bell board or a key strip.

The first operator console keypad 25 has in the first exemplary embodiment 16 keys with a respectively associated key inscription. The first key inscription 27, belonging to the first key 26, has the text "PR—normal operation".

The first key 26 and all further keys of the first operator console keypad 25 are provided as robust and reliable keys and have a light which signals the respectively chosen key by lighting up. According to the first exemplary embodiment, only one key can be respectively selected at the same time.

The meaning of each key can be allocated in a user-defined manner and separately for each production machine.

The keys have intermediate spaces of sufficient size in each case. The names of the key inscriptions can be easily provided and exchanged.

On the first operator console keypad 25, an operator not shown here can make manual inputs. These manual inputs allow supplementary information which cannot be recorded from the components of the production machine to be registered and passed on.

For example, the manual inputs of the information "UD—waiting for technician", "UD—waiting for supplier" or "UD—system off" allow the status of "unscheduled downtime UD" or "unscheduled standstill time UD", which can be determined from the signals of the machine components that can be automatically picked up, to be further detailed.

Figure 3:
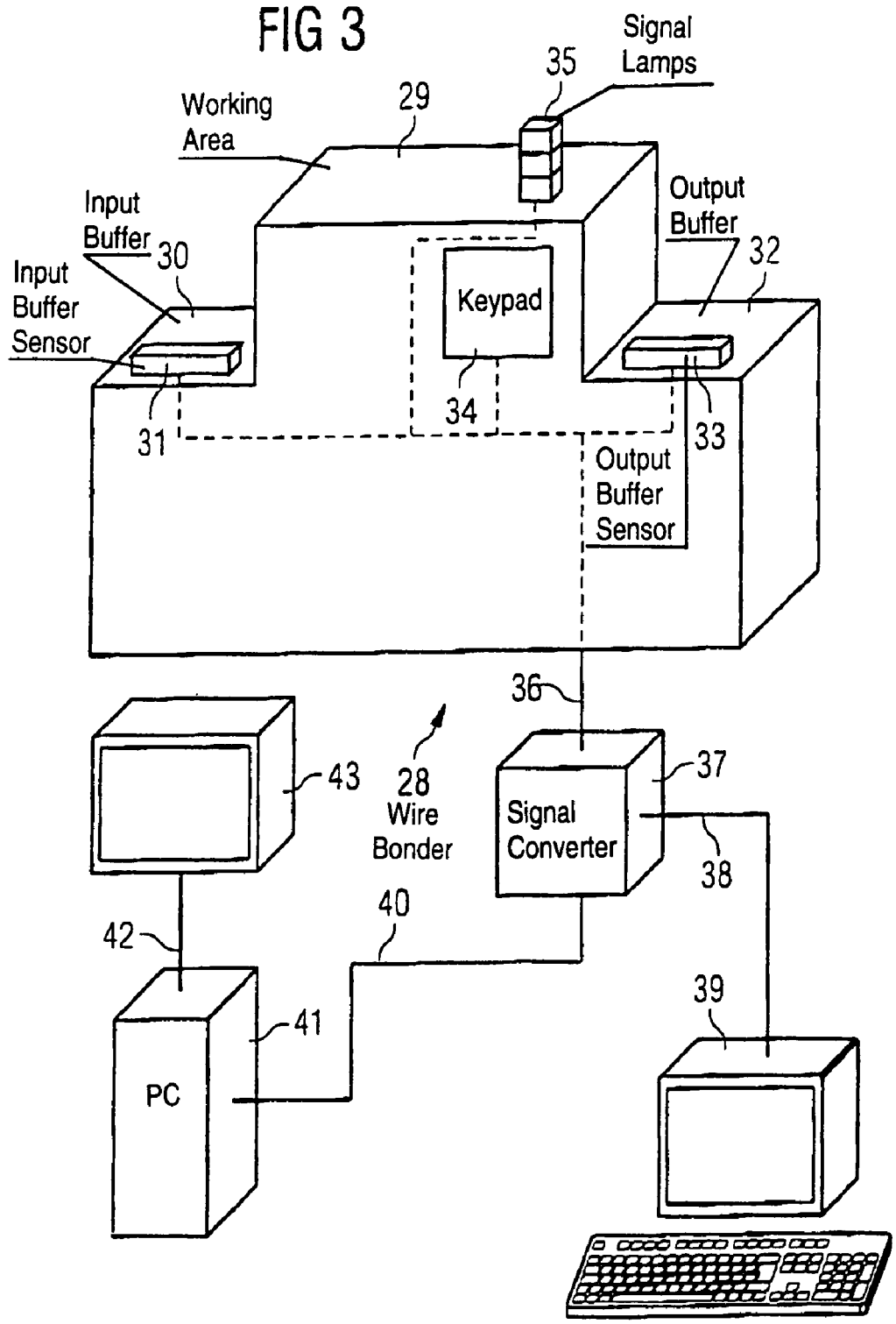
FIG. 3 shows a schematic perspective representation of a second wire bonder, a sixth data connection, a second signal converter, a second bus connection, a line PC, a seventh data connection, a machine PC, an eighth data connection and a touch-sensitive screen or a touchscreen according to a second exemplary embodiment.

FIG. 3 shows a second wire bonder 28, a sixth data connection 36, a second signal converter 37, a second bus connection 38, a line PC 39, a seventh data connection 40, a machine PC 41, an eighth data connection 42 and a touch-sensitive screen or a touchscreen 43 according to a second exemplary embodiment.

The second wire bonder 28 has a second working area 29, a second input buffer 30, a second input buffer sensor 31, a second output buffer 32, a second output buffer sensor 33, a second operator console keypad 34 and second signal lamps 35.

The second input buffer sensor 31, the second output buffer sensor 33, the second operator console keypad 34 and the second signal lamps 35 are connected by means of a sixth data connection 36 to the second signal converter 37.

The second signal converter 37 is connected via a seventh data connection 40 to a machine PC 41. The machine PC 41 is connected with the aid of an eighth data connection 42 to a touchscreen 43.

The second signal converter 37 is connected by means of a bus connection 38, preferably a customary industrial bus connection, to a line PC 39.

The second wire bonder 38 is part of a semiconductor production line. It is intended for processing semiconductor substrates not shown here. The second wire bonder 28 corresponds with respect to construction and functionality to the first wire bonder 1, shown in FIG. 1, with the difference that the second wire bonder 28 does not include a pressure sensor 5 or an indexer 6.

For determining and checking the operating statuses of the wire bonder 1, the second input buffer sensor 31, the second output buffer sensor 33, the second operator console keypad 34 and the second signal lamps 35 are available as data sources.

The configuration according to the invention allows signals from the second input buffer sensor 31, from the second output buffer sensor 33, from the second operator console keypad 34 and from the second signal lamps 35 to be transmitted to the machine PC 41 and made visible on the touchscreen 43.

In the second exemplary embodiment, signals can be passed back from the machine PC 41 via the second signal converter 37 to the second wire bonder 28, for example to the second signal lamps 35. Consequently, machine components, for example the second signal lamps 35 of the second wire bonder 28, can receive signals bringing about status changes. For example, such a signal may bring about a changeover of the second signal lamps 35 from "green" to "yellow".

Furthermore, data of the second wire bonder 28 can be transmitted via the second signal converter 37 and a bus connection 38 to the line PC 39 and be presented on the line PC 39.

On the touchscreen 43, the input possibilities can be defined by the operator. Furthermore, a multitude of further information, for example information on batches produced, is available on the touchscreen.

Figure 4:
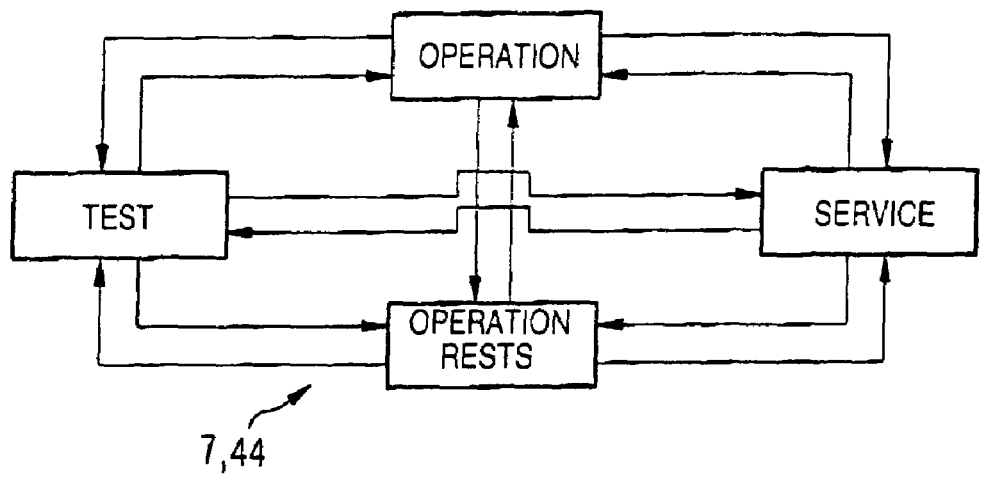
FIG. 4 shows a schematic representation of a keypad status model of the second wire bonder shown in FIG. 3 according to the second exemplary embodiment.

FIG. 4 shows a keypad status model 44 of the second wire bonder 28 shown in FIG. 3 according to the second exemplary embodiment.

The keypad status model 44 has the statuses of "operation", "test", "maintenance" and "operational inactivity".

Using the keys of the keypad 7, the statuses represented as rectangles in FIG. 4, "operation", "test", "maintenance" and "operational inactivity", can be assigned to the second wire bonder 28 by an operator not shown here.

The statuses of the keypad status model 44 may have various meanings. The "operation" status can mean that the second wire bonder 28 is working or that the second wire bonder 28 has no material, and that the second wire bonder 28 has a minor malfunction. The "test" status signals that the second wire bonder 28 is being used for test purposes or that a trial run is being carried out on the second wire bonder 28. The "maintenance" status indicates that repair or maintenance work is being performed on the second wire bonder 28. The "operational inactivity" status means that the second wire bonder 28 is temporarily not in operation.

The arrows represented in FIG. 4 between the statuses represented as rectangles respectively signal a change in status. These changes in status are caused by the operator by actuating keys on the second operator console keypad 34.

From each of the statuses of "operation", "test", "maintenance" and "operational inactivity", in each case all the other statuses of the keypad status model 44 can be reached directly.

Figure 5:
FIG. 5 shows a schematic representation of a buffer sensor status model of the second wire bonder shown in FIG. 3 according to the second exemplary embodiment.

FIG. 5 shows a buffer sensor status model 45 of the second wire bonder 28 according to the second exemplary embodiment.

The buffer sensor status model 45 is identically constructed for the second input buffer sensor 31 and for the second output buffer sensor 33.

The buffer sensor status model 45 has the statuses represented as rectangles in FIG. 5, "full", "free" and "empty".

In the operation of the second wire bonder 28, the statuses of the buffer sensor status model 45 can have the following meanings.

The "full" status means that the second input buffer 30 or the second output buffer 32 is full with semiconductor substrates and cannot receive any further semiconductor substrates. In the "full" status, it is possible that the second wire bonder 28 is in productive operation or has a malfunction.

The "free" status indicates that the number of semiconductor substrates contained in the second input buffer 30 or in the second output buffer 32 is greater than zero and less than the maximum amount of semiconductor substrates which can be received in the second input buffer 30 or in the second output buffer 32. In the "free" status, it is possible that the second wire bonder 28 is in productive operation or has a malfunction.

In the "empty" status of the second wire bonder 28, the number of semiconductor substrates contained in the second input buffer 30 or in the second output buffer 32 is equal to zero. In the "empty" status, the situation may exist that the second wire bonder 28 has a malfunction or that the second wire bonder 28 has an empty second input buffer 30 or empty second output buffer 32, or that the second wire bonder 28 is idling.

The arrows represented in FIG. 5 between the statuses of the buffer sensor status model of "full", "free" and "empty" signal the respective transitions between the statuses.

From the "full" status, the "free" status can be reached. From the "free" status, it is possible to pass both into the "full" status and into the "empty" status. From the "empty" status, the "free" status can be reached.

The meanings of the statuses of "full", "free" and "empty" are identical both for the second input buffer 30 and for the second output buffer 32. The effects of the "full", "free" and "empty" statuses on the operation of the second wire bonder 28 are different.

The "empty" status of the second input buffer 30 stops the productive operation of the second wire bonder 28. No semiconductor substrates can pass into the second working area 29 of the second wire bonder 28.

The "full" status of the second output buffer 32 stops the productive operation of the second wire bonder 28. The full second output buffer 32 blocks the production in the second working area 29 of the second wire bonder 28.

Figure 6:
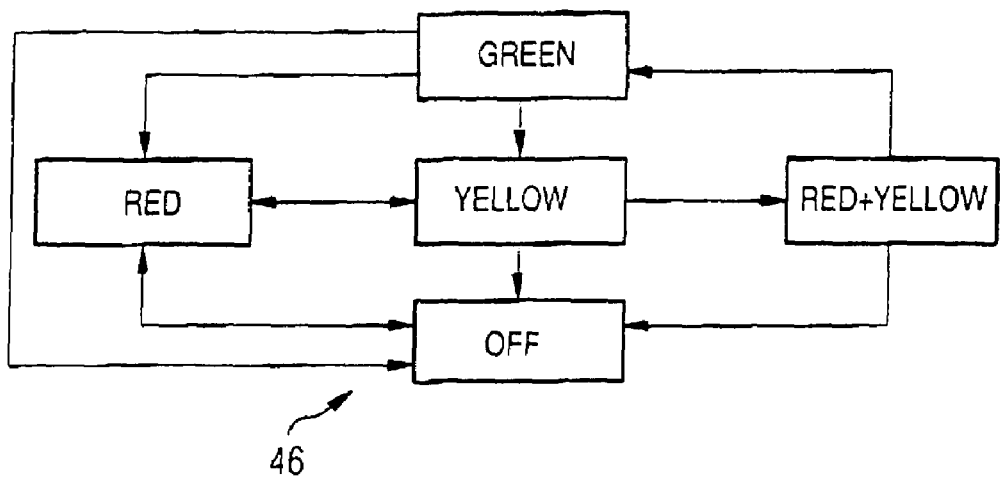
FIG. 6 shows a schematic representation of a signal lamp status model of the second wire bonder shown in FIG. 3 according to the second exemplary embodiment.

FIG. 6 shows a signal lamp status model 46 according to the second exemplary embodiment.

The signal lamp status model 46 is divided into the statuses represented as rectangles in FIG. 6, "green", "red", "yellow", "off" and "red+yellow".

The "green" status indicates that the second wire bonder 28 is working. In this case, it is possible for the second wire bonder 28 to be in productive operation or to be resuming productive operation after an interruption.

The "yellow" status means that the second wire bonder 28 is at a standstill or idling. This "yellow" status exists, for example, when the operator switches the second wire bonder 28 from the previous status of "green" to idling. This "yellow" status also exists when repairs are being carried out and the previous status is "red" and the following status is "red". Furthermore, the "yellow" status is conceivable if a full second output buffer 32 stops the second wire bonder 28.

The "red" status indicates a fault in the operation of the second wire bonder 28. This status can occur if a fault occurs in productive operation or at a standstill.

The "off" status occurs when the second wire bonder 28 is switched off by the operator or when the power supply of the second wire bonder 28 fails.

The "red+yellow" status occurs when the second wire bonder 28 is preparing itself for the actual production process. This may be the case when the second wire bonder 28 is started from idling in the "yellow" status, and when a fault is rectified and the productive operation of the second wire bonder 28 is restarted.

The arrows in FIG. 6 connect the statuses represented as rectangles of the signal lamp status model 8 to one another. These arrows respectively signal a status transition between two statuses. Arrows which connect two identical statuses to each other and run in opposite directions are represented in FIG. 6 in each case as one arrow with two heads, for better clarity.

The status transitions represented in FIG. 6 by means of arrows are performed during the operation of the second wire bonder 28 by the machine control of the second wire bonder 28.

From the "green" status, the "red" status, the "yellow" status and the "off" status can be reached. From the "yellow" status, a status transition into the "red" status, into the "off" status and into the "red+yellow" status is possible. Starting from the "red" status, it is possible to pass either into the "yellow" status or into the "off" status. Starting from the "red+yellow" status, a transition into the "green" status and into the "off" status is possible. From the "off" status, only the "red" status can be reached.

Figure 7:
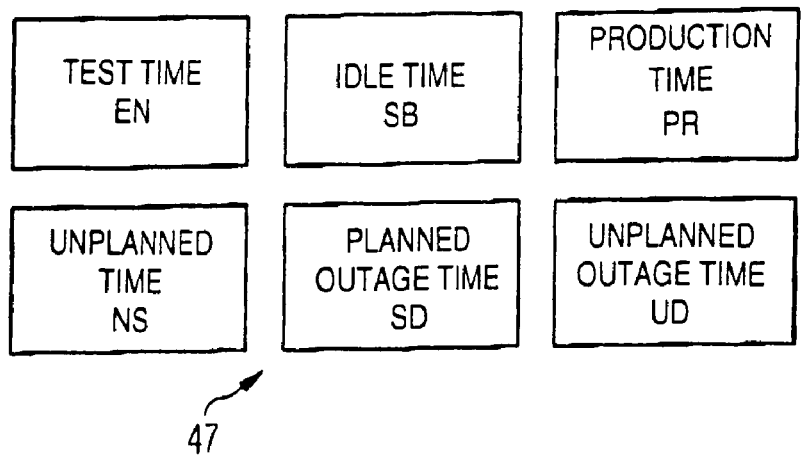
FIG. 7 shows a schematic representation of an evaluation status model according to the second exemplary embodiment.

FIG. 7 shows an evaluation status model 47 according to the second exemplary embodiment.

The evaluation status model 47 is divided into the main statuses of "test time EN", "idling time SB", "production time PR", "not-scheduled time NS", "scheduled standstill time SD" and "unscheduled standstill time UD".

The main statuses of the evaluation status model 47 shown in FIG. 7 correspond to the international standard "Semiconductor Equipment and Materials International E10" or "SEMI E10". By means of this evaluation status model 47, all the operating statuses of the second wire bonder 28 can be assigned to the main statuses of "test time EN", "idling time SB", production time PR", "not-scheduled time NS", "Scheduled standstill time SD" and "unscheduled standstill time UD".

The calculation of the characteristic values of the capacity utilization, reliability and availability of the second wire bonder 28, such as for example "Mean Time Between Failure" or "MTBF", "Total Utilization" or "TU" and "Uptime Utilization" or "UU", are based on the exact registration of the number and accumulated duration of these main statuses of the evaluation status model 47.

Between the main statuses of the evaluation status model 47 shown in FIG. 7, any desired changes in status not shown in FIG. 7 are possible. The main statuses can be detailed in further substatuses.

Under the main status of "test time EN", all the operating statuses of the second wire bonder 28 in which tests or trial runs are carried out can be subsumed. Under the main status of "idling time SB", all the operating statuses of the second wire bonder 28 in which the second wire bonder 28 is idling or in a waiting position can be aggregated. The main status of "production time PR" is used for registering all the operating statuses of the second wire bonder 28 in which the second wire bonder 28 is in productive operation and is wiring semiconductor substrates. Under the main status of "not-scheduled time NS", all the operating statuses of the second wire bonder 28 in which the second wire bonder 28 is in previously unscheduled operational inactivity are subsumed. The main status of "scheduled standstill time SD" covers all those operating statuses in which maintenance and repair work is carried out on the second wire bonder 28. All the operating statuses in which there is a malfunction or a fault in the productive operation of the second wire bonder 28 are subsumed under the main status of "unscheduled standstill time UD".

Figure 8:
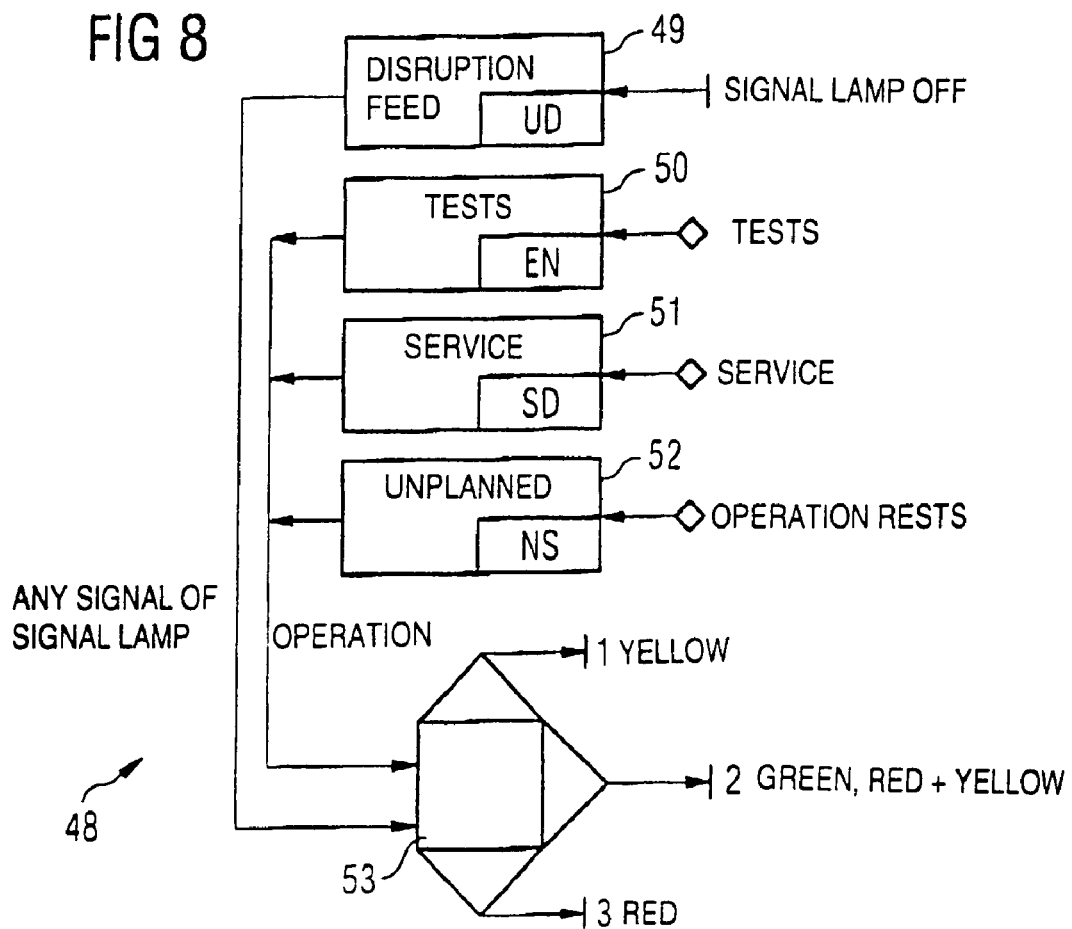
FIG. 8 shows a schematic representation of a first part of an interpretation status model of the second wire bonder shown in FIG. 3 according to the second exemplary embodiment.
Figure 9:
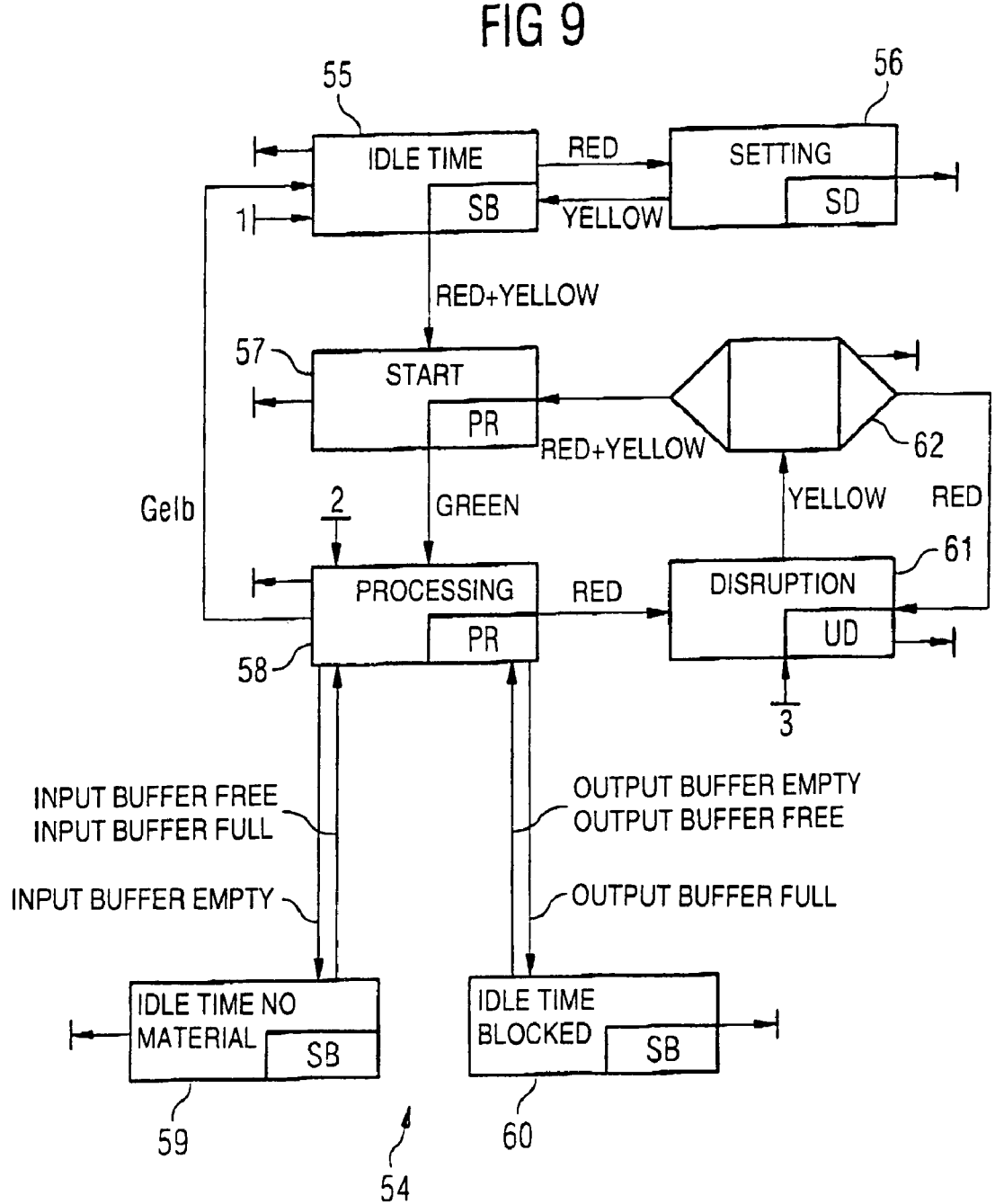
FIG. 9 shows a schematic representation of a second part of the interpretation status model of the second wire bonder shown in FIG. 3 according to the second exemplary embodiment.

The main statuses of the evaluation status model 47 of the second wire bonder 28 can be determined from the statuses and the status transitions of the keypad status model 44, the buffer sensor status model 45 and the signal lamp status model 46, using an interpretation status model shown in FIG. 8 and in FIG. 9.

Each main status is assigned a time account. Registered on each time account are the time periods of the main statuses of the evaluation model which the second wire bonder 28 or further production machines not shown here are respectively in.

FIG. 8 shows a first part of the interpretation status model 48 of the second wire bonder 28 according to the second exemplary embodiment.

FIG. 9 shows a second part of the interpretation status model 54 of the second wire bonder 28 according to the second exemplary embodiment.

The first part of the interpretation status model 48 and the second part of the interpretation status model 54 have a number of operating statuses, represented as rectangles in FIG. 8 and in FIG. 9.

Each operating status in the first part of the interpretation status model 48 and in the second part of the interpretation status model 54 is assigned to a main status of the evaluation status model 47 according to FIG. 7. Each operating status is assigned a time account.

This is respectively illustrated in FIG. 8 and in FIG. 9 of the second exemplary embodiment by the two letters which are contained in the bottom right-hand corner of the rectangles in which the operating statuses are represented.

The letters "EN", "SB", "PR", "NS", "SD" and "UD" of the respective operating statuses correspond to the main statuses of "test time EN", "idling time SB", production time PR", "not-scheduled time NS", "scheduled standstill time SD" and "unscheduled standstill time UD" from the evaluation status model 47 according to FIG. 7.

The operating statuses of the second wire bonder 28 are connected to one another by status transitions represented as arrows in FIG. 8 and in FIG. 9.

The transitions of the operating statuses in the first part of the interpretation status model 48 and in the second part of the interpretation status model 54 are caused by the statuses and status transitions of the second operator console keypad 34 according to the keypad status model 44, by the statuses and status transitions of the second input buffer sensor 31 and the second output buffer sensor 33 according to the buffer sensor status model 45 and by the statuses and status transitions of the second signal lamps 35 according to the signal lamp status model 46.

The first part of the interpretation status model 48 is divided into an operating status of feeding malfunction UD 49, an operating status of tests EN 50, an operating status of maintenance SD 51, an operating status of unscheduled NS 52 and a first temporary operating status 53.

The operating status of feeding malfunction UD 49 is reached from the "signal lamps off" status. This means that the operating status of feeding malfunction UD 49 is reached immediately after the second wire bonder 28 is switched on by the operator. The status of feeding malfunction UD 49 indicates that there is a fault in the supply of the second wire bonder 28 with semiconductor substrates. This may be the case, for example, if a semiconductor substrate is canted in the second working area 29 of the second wire bonder 28 and consequently no productive operation is possible in the second working area 29. The machine control of the second wire bonder 28 automatically goes into this operating status. The presence of the operating status of feeding malfunction UD 49 does not necessarily mean that there actually is a malfunction. It is a checking status in which the operating status is determined.

Starting from the operating status of feeding malfunction UD 49, the first temporary operating status 53 is reached by any desired signal of the second signal lamps 35 as the following status.

In the operating status of tests EN 50, maintenance and repair work are performed on the second wire bonder 28 by an operator. The operating status of tests EN 50 is reached by the priority event "test" from any desired operating status. A priority event has priority over all other events. The priority event "test" is initiated by an operator from any desired operating status of the second wire bonder 28 according to the interpretation status model by actuating the "test" key on the second operator console keypad 34. Starting from the operating status of tests EN 50, the first temporary operating status 53 is reached by the event "operation" as the following status. For this, the "operation" key on the second operator console keypad 34 is actuated by the operator in the operating status of tests EN 50.

In the operating status of maintenance SD 51, regular and preventive maintenance work is performed on the second wire bonder 28 by an operator. The operating status of maintenance SD 51 is reached by the priority event "maintenance". This means that the operator actuates the "maintenance" key on the second operator console keypad 34 in any desired operating status. Starting from the operating status of maintenance SD 51, the first temporary operating status 53 is reached as the following status by the event "operation", i.e. by the actuation of the "operation" key on the second operator console keypad 34.

In the operating status of unscheduled NS 52, previously unscheduled repair work is undertaken on the second wire bonder 28 by an operator. The operating status of unscheduled NS 52 is reached by the priority event "operational inactivity", which is initiated by actuating the "operational inactivity" key on the second operator console keypad 34 by the operator. As the following status of the operating status of unscheduled NS 52, the first temporary operating status 53 is reached by the event "operation". The event "operation" occurs whenever the "operation" key on the second operator console keypad 34 of the second wire bonder 28 is actuated by the operator.

In the first temporary operating status 53, a different following status in each case is reached in accordance with the statuses of the second signal lamps 35. Accordingly, the first temporary operating status 53 brings about branching in accordance with the respectively lighted lights of the second signal lamps 35.

The first temporary operating status 53 is reached from the operating status of feeding malfunction UD 49, from the operating status of tests EN 50, from the operating status of maintenance SD 51 and from the operating status of unscheduled NS 52.

In the first temporary operating status 53, it is established which lights of the second signal lamps 35 light up. In the case of the yellow light of the second signal lamps 35 lighting up, the first temporary operating status 53 branches to the point 1 in the second part of the interpretation status model 54. In the case of the green light of the second signal lamps 35 lighting up or in the case of the red and yellow lights of the second signal lamps 35 both lighting up, the procedure continues at the point 2 in the second part of the interpretation status model 54. If the red light of the second signal lamps 35 lights up, there follows the status transition to the point 3 in the second part of the interpretation status model 54.

The second part of the interpretation status model 54 has an operating status of idling SB 55, an operating status of setting SD 56, an operating status of starting PR 57, an operating status of processing PR 58, an operating status of idling, no material SB 59, an operating status of idling blocked SB 60, an operating status of malfunction UD 61 and a second temporary operating status 62.

The arrows which leave from the respective operating statuses and point to a vertical bar indicate switching-off of the second wire bonder 28 from the respective operating status.

The arrows which leave from a horizontal or vertical bar having a number and point to an operating status symbolize a status transition from the first temporary operating status 53 of the first part of the interpretation status model 48 according to FIG. 8.

In the operating status of idling SB 55, the second wire bonder 28 is idling.

The operating status of idling SB 55 is reached by a status transition with the event "yellow" from the previous status of setting SD 56. Furthermore, the operating status of idling SB 55 is reached by a status transition with the event "yellow" from the previous status of processing PR 58. Furthermore, the operating status of idling SB 55 is reached by a status transition from the first temporary operating status 53 with the event "yellow" from the first part of the interpretation status model 48.

Starting from the operating status of idling SB 55, the operating status of setting SD 56 can be reached by the event "red". Accordingly, this status transition takes place when the red light of the second signal lamps 35 lights up. The lighting-up of the red and yellow lights of the second signal lamps 35 has the effect that the operating status of starting PR 57 is reached as the following status. Furthermore, the switching-off of the second wire bonder 28 from the operating status of idling SB 55 is possible. This is indicated by the arrow which points to the vertical bar.

The operating status of setting SD 56 indicates that the second wire bonder 28 is being run up or prepared for the production process.

The operating status of setting SD 56 is reached from the previous status of idling SB 55 by the event "red" occurring.

Starting from the operating status of setting SD 56, the following status of idling SB 55 is reached. In this case, the event "yellow" occurs. Accordingly, the yellow light of the second signal lamps 35 lights up. Furthermore, switching-off of the second wire bonder 28 is possible from the operating status of setting SD 56.

The operating status of starting PR 57 indicates that the second wire bonder 28 is starting the production process.

The operating status of starting PR 57 is reached from the operating status of idling SB 55 by the event "red+yellow". Furthermore, the operating status of starting PR 57 is reached from the second temporary operating status 62 by the event "red+yellow".

Starting from the operating status of starting PR 57, the operating status of processing PR 58 is reached as the following status. In this case, the event "green" occurs. This shows that the green light of the second signal lamps 35 lights up. Furthermore, switching-off of the second wire bonder 28 is possible from the operating status of starting PR 57.

In the operating status of processing PR 58, the second wire bonder 28 is in production operation.

The operating status of processing PR 58 is reached from the first temporary operating status 53 by the event "green" or by the event "red+yellow". This is represented in FIG. 9 by the arrow leaving from a horizontal bar, pointing to the operating status of processing PR 58 and provided with the number "2".

As a further previous status of the operating status of processing PR 58, the operating status of starting PR 57 is possible. In this case, the lighting of the green light of the second signal lamps 35 is intended as the event.

Furthermore, the operating status of idling, no material SB 59 is intended as the previous status. In this case, the event "input buffer free" or the event "input buffer full" occurs.

This means that the second input buffer sensor 31 indicates that the second input buffer 30 has an either free or full filling status.

Furthermore, the operating status of processing PR 58 can be reached from the operating status of idling blocked SB 60. In this case, either the event "output buffer empty" or the event "output buffer free" occurs. This means that the second output buffer sensor 33 signals that the second output buffer 32 has either an empty or a free filling status.

As following statuses of the operating status of processing PR 58, the operating status of idling SB 55, the operating status of idling, no material SB 59, the operating status of idling blocked SB 60 and the operating status of malfunction UD 61 are possible.

In the case of the event "yellow", i.e. the lighting-up of the yellow light of the second signal lamps 35, the operating status of idling SB 55 is reached as the following status.

In the case of the event "input buffer empty", the operating status of idling, no material SB 59 is reached as the following status. In this case, the second input buffer sensor 31 reports that the input buffer is empty.

In the case of the event "output buffer full", the second wire bonder 28 goes into the operating status of idling blocked SB 60. This means that the second output buffer sensor 33 registers that the second output buffer 32 is full.

The event "red", i.e. the lighting-up of the red light of the second signal lamps 35, has the effect that the second wire bonder 28 goes into the operating status of malfunction UD 61. This means that a fault occurs in the production process.

In the operating status of idling, no material SB 59, the second wire bonder 28 has an empty second input buffer 30 and is accordingly idling.

The operating status of idling, no material SB 59 is reached from the operating status of processing PR 58. In this case, the event "input buffer empty" occurs, that is to say a checkback signal of the second input buffer sensor 31 that the second input buffer 30 is empty.

The operating status of processing PR 58 is provided as the following status of the operating status of idling, no material SB 59. This is reached by the events "input buffer free" or "input buffer full". This means that the second input buffer sensor 31 indicates that the second input buffer 30 is either free or full.

Furthermore, the switching-off of the second wire bonder 28 is provided as the event from the operating status of idling, no material SB 59.

In the operating status of idling blocked SB 60, the second output buffer 32 of the second wire bonder 28 is full. Accordingly, the second wire bonder 28 is idling.

The operating status of idling blocked SB 60 is reached from the operating status of processing PR 58 by the event "output buffer full". Here, the second output buffer sensor 33 reports that the second output buffer 32 is fully occupied and cannot receive any further semiconductor substrates.

As the subsequent status of the operating status of idling blocked SB 60, the operating status of processing PR 58 is possible. This status is reached by the events "output buffer empty" and "output buffer free", that is to say by an indication of the second output buffer sensor 33 that the second output buffer 32 is either empty or free.

Furthermore, switching-off of the second wire bonder 28 is possible from the operating status of idling blocked SB 60.

If the operating status of malfunction UD 61 occurs, the second wire bonder 28 has a malfunction or a fault in the production sequence.

The operating status of processing PR 58 represents a previous status of the operating status of malfunction UD 61. The status transition takes place by the event "red", that is to say by lighting-up of the red light of the second signal lamps 35.

The second temporary operating status 62 represents a further previous status of the operating status of malfunction UD 61. In this case, the event "red" occurs, that is to say lighting-up of the red light of the second signal lamps 35.

Furthermore, the first temporary operating status 53 of the first part of the interpretation status model 48 according to FIG. 8 is intended as a previous status. This is identified in FIG. 9 by the number "3" and the arrow leaving from a bar and pointing at the operating status of malfunction UD 61. In this case, the event "red" occurs. Accordingly, the red light of the second signal lamps 35 lights up.

As a following status, the second temporary operating status 62 is reached by the event "yellow", i.e. by the lighting-up of the yellow lamp of the second signal lamps 35.

Switching-off of the second wire bonder 28 is likewise intended to follow from the operating status of malfunction UD 61.

In the second temporary operating status 62, branching into the production process or into a fault status is performed in accordance with the lighting-up lights of the second signal lamps 35, and a different following status is reached in each case.

The second temporary operating status 62 is called up from the operating status of malfunction UD 61 by the event "yellow", that is to say the lighting-up of the yellow lamp of the second signal lamps 35.

In the case of the event "red", synonymous with the lighting-up of the red light of the second signal lamps 35, the operating status of malfunction UD 61 is called up as the following status of the second temporary operating status 62.

In the case of the event "red+yellow", the operating status of starting PR 57 is called up as the following status of the second temporary operating status 62.

Furthermore, switching-off of the second wire bonder 28 is intended to follow from the second temporary operating status 62.

The determination of the operating statuses of the second wire bonder 28 from the interpretation status model using the statuses of the keypad status model 44, the buffer sensor status model 45 and the signal lamp status model 46 is presented below on the basis of the second exemplary embodiment.

The statuses of the keypad status model 44, the buffer sensor status model 45 and the signal lamp status model 46 are passed on via the sixth data connection 36 to the second signal converter 37.

The second signal converter 37 transmits all the signals in real time via the second bus connection 38 to the line PC 39. In the line PC 39, the operating statuses of the second wire bonder 28 are determined according to the interpretation status model from the statuses of the keypad status model 44, the buffer sensor status model 45 and the signal lamp status model 46.

The operating statuses of the second wire bonder 28 can be assigned to the main statuses of the evaluation status model 47.

All the operating statuses of the second wire bonder 28 according to the interpretation status model are registered on the line PC 39 in the event history.

All the amounts of time which correspond to the time periods in which the second wire bonder 28 is in the respective operating statuses are entered into the time account of the respective operating status. Temporary operating statuses are entered into the time account of the respective following status in the interpretation status model.

From this information, the accumulated times of the operating statuses can be determined according to the interpretation status model and the respectively corresponding main statuses according to the evaluation model. Accordingly, a precise evaluation of the operating statuses of the second wire bonder 28 is possible.

At the beginning of the second exemplary embodiment, the second wire bonder 28 is in the switched-off status. The second signal lamps 35 are in the "off" status. Neither the second input buffer sensor 31, nor the second output buffer sensor 33, nor the second operator console keypad 34 emits a signal.

The operator switches on the second wire bonder 28. After switching-on, the second wire bonder 28 goes into the operating status of feeding malfunction UD 49.

The amount of time of the time period in which the second wire bonder 28 has the operating status of feeding malfunction UD 49 according to the interpretation status model is entered into the time account of the main status of "scheduled standstill time SD" according to the evaluation status model 47.

A machine control not shown here of the second wire bonder 28 automatically establishes the technical status of the second wire bonder 28, by interrogating sensors and actuators and moving to end positions. This machine control initiates in accordance with the respective technical status of the second wire bonder 28 the lighting-up of the lights of the second signal lamps 35 corresponding to the respective technical status according to the signal lamp status model 46.

In the present second exemplary embodiment, the machine control detects that the second wire bonder 28 is idling and accordingly initiates the lighting-up of the yellow light of the second signal lamps 35. This lighting-up of the yellow light of the second signal lamps 35 has the effect that, according to the first part of the interpretation status model 48, a status transition is performed into the first temporary operating status 53.

A status transition into the first temporary operating status 53 from the operating status of tests EN 50, from the operating status of maintenance SD 51 and from the operating status of unscheduled NS 52 is likewise possible by actuation of the "operation" key on the second operator console keypad 34 by an operator.

A machine control not shown here of the second wire bonder 28 automatically establishes the technical status of the second wire bonder 28 after the actuation of the "operation" key. This machine control initiates in accordance with the respective technical status of the second wire bonder 28 the lighting-up of the lights of the second signal lamps 35 corresponding to the respective technical status according to the signal lamp status model 46.

In the first temporary operating status 53, passing on to different following statuses takes place in accordance with the various statuses according to the signal lamp status model 46.

The amount of time of the time period in which the second wire bonder 28 has the first temporary operating status 53 according to the interpretation status model is assigned in the second exemplary embodiment to the following operating status of idling SB 55 according to the interpretation status model and entered into the time account of the corresponding main status of "idling time SB" according to the evaluation status model 47.

In the second exemplary embodiment, the "yellow" status of the signal lamp status model 46 is obtained. Consequently, the interpretation status model indicates the following status denoted by 1 of the first temporary operating status 53. Accordingly, from the first temporary operating status 53, a change in status to the operating status of idling SB 55 takes place in FIG. 9 in the case of the event "yellow" of the signal lamp status model 46.

In the operating status of idling SB 55, the second wire bonder 28 is idling.

The amount of time of the time period in which the second wire bonder 28 has the operating status of idling SB 55 according to the interpretation status model is entered in the second exemplary embodiment into the time account of the corresponding main status of "idling time SB" according to the evaluation status model 47.

In the second exemplary embodiment, at this point a malfunction occurs, which is automatically detected by the machine control and indicated by the red light of the second signal lamps 35. Accordingly, a status change to the operating status of setting SD 56 is initiated.

The amount of time of the time period in which the second wire bonder 28 has the operating status of setting SD 56 according to the interpretation status model is entered in the second exemplary embodiment into the time account of the corresponding main status of "scheduled standstill time SD" according to the evaluation status model 47.

In the operating status of setting SD 56, an operator intervention takes place. The malfunction of the second wire bonder 28 is rectified by this operator intervention. After completion of the operator intervention, the operator actuates a corresponding switch or a corresponding key of the second wire bonder 28. Accordingly, the machine control of the second wire bonder 28 brings about the lighting-up of the yellow light of the second signal lamps 35. As a result, a status transition into the operating status of idling SB 55 is brought about.

The amount of time of the time period in which the second wire bonder 28 has the operating status of idling SB 55 according to the interpretation status model is entered in the second exemplary embodiment into the time account of the corresponding main status of "idling time SB" according to the evaluation status model 47.

In the operating status of idling SB 55, the operator starts the productive operation of the second wire bonder 28 by actuating a corresponding switch or a corresponding key of the second wire bonder 28. The machine control of the second wire bonder 28 detects this and signals by lighting up the red and yellow lights of the second signal lamps 35 that the second wire bonder 28 is in a self-preparation mode for the production process, in which, for example, the second wire bonder 28 interrogates the second input buffer sensor 31, the second output buffer sensor 33 and further sensors not shown here and also actuators not shown here and moves to end positions. After this self-preparation mode, an automatic change in status into the operating status of starting PR 57 takes place.

The amount of time of the time period in which the second wire bonder 28 has the operating status of starting PR 57 according to the interpretation status model is entered in the second exemplary embodiment into the time account of the corresponding main status of "production time PR" according to the evaluation status model 47.

In the operating status of starting PR 57, the second wire bonder 28 commences the production process. The machine control of the second wire bonder 28 detects this automatically and indicates it in the form of lighting up the green light of the second signal lamps 35. This event brings about a change in status into the operating status of processing PR 58.

The amount of time of the time period in which the second wire bonder 28 has the operating status of processing PR 58 according to the interpretation status model is entered in the second exemplary embodiment into the time account of the corresponding main status of "production time PR" according to the evaluation status model 47.

In the operating status of processing PR 58, the second wire bonder 28 is in the production process.

At this point of the second exemplary embodiment, a malfunction occurs in the production process. This malfunction may be caused, for example, by jamming of the semiconductor substrate in the second operating area 29 of the second wire bonder 28 and by a resultant malfunction of an automatic handling unit not shown here. The machine control of the second wire bonder 28 detects this malfunction automatically and passes it on in the form of lighting up the red light of the second signal lamps 35. This leads to a change in status into the operating status of malfunction UD 61.

The amount of time of the time period in which the second wire bonder 28 has the operating status of malfunction UD 61 according to the interpretation status model is entered in the second exemplary embodiment into the time account of the corresponding main status of "unscheduled standstill time UD" according to the evaluation status model 47.

In the operating status of malfunction UD 61, an operator intervention takes place to rectify the malfunction. After the operator intervention, the operator releases the second wire bonder 28 by actuating a corresponding switch or a corresponding key to continue the production process. This is signaled by the machine control of the second wire bonder 28 by the lighting-up of the yellow light of the second signal lamps 35. The lighting-up of the yellow light of the second signal lamps 35 has the effect that a change in status into the second temporary operating status 62 takes place.

The amount of time of the time period in which the second wire bonder 28 has the second temporary operating status 62 according to the interpretation status model is assigned in the second exemplary embodiment to the following operating status of malfunction UD 61 according to the interpretation status model and entered into the time account of the corresponding main status of "unscheduled standstill time UD" according to the evaluation status model 47.

In the second temporary operating status 62, it is automatically established by the machine control of the second wire bonder 28, for example by an interrogation of sensors not shown here, whether the malfunction that has occurred was rectified by the operator intervention or whether renewed operator intervention is necessary. In the second exemplary embodiment, the machine control of the second wire bonder 28 signals by the lighting-up of the red light of the second signal lamps 35 that the malfunction has not been completely rectified and that a renewed operator intervention is necessary. Lighting up of the red light of the second signal lamps 35 has the effect that a status transition into the operating status of malfunction UD 61 takes place.

The amount of time of the time period in which the second wire bonder 28 has the operating status of malfunction UD 61 according to the interpretation status model is entered in the second exemplary embodiment into the time account of the corresponding main status of "unscheduled standstill time UD" according to the evaluation status model 47.

In this operating status, a renewed operator intervention takes place to rectify the malfunction. After the renewed operator intervention, the operator gives the second wire bonder 28 the signal for the production process to be resumed again in the form of actuating a switch or a key. This is indicated by the machine control of the second wire bonder 28 in the form of switching on the yellow light of the second signal lamps 35. This leads to a change in status into the second temporary operating status 62.

The amount of time of the time period in which the second wire bonder 28 has the second temporary operating status 62 according to the interpretation status model is assigned in the second exemplary embodiment to the following operating status of starting PR 57 according to the interpretation status model and entered into the time account of the corresponding main status of "production time PR" according to the evaluation status model 47.

It is established there by the machine control of the second wire bonder 28 that the malfunction has been rectified and that no renewed operator intervention is necessary. This is signaled by the machine control of the second wire bonder 28 by the lighting-up of the yellow and red lamps of the second signal lamps 35. This leads to a change in status into the operating status of starting PR 57.

The amount of time of the time period in which the second wire bonder 28 has the operating status of starting PR 57 according to the interpretation status model is entered in the second exemplary embodiment into the time account of the corresponding main status of "production time PR" according to the evaluation status model 47.

In the operating status of starting PR 57, the second wire bonder 28 resumes the production process. This is automatically established by the machine control of the second wire bonder 28 and passed on in the form of lighting up the green light of the second signal lamps 35. As a result, a status transition into the operating status of processing PR 57 is initiated.

The amount of time of the time period in which the second wire bonder 28 has the operating status of processing PR 57 according to the interpretation status model is entered in the second exemplary embodiment into the time account of the corresponding main status of "production time PR" according to the evaluation status model 47.

In the operating status of processing PR 57, the second wire bonder 28 is working in the production process. At this point of the second exemplary embodiment, the second input buffer sensor 31 automatically detects the "empty" status of the second input buffer 30. This means that there are no semiconductor substrates in the second input buffer 30 for processing in the second working area 29 of the second wire bonder 28. This event causes a change in status into the operating status of idling, no material SB 59.

The amount of time of the time period in which the second wire bonder 28 has the operating status of idling, no material SB 59 according to the interpretation status model is entered in the second exemplary embodiment into the time account of the corresponding main status of "idling time SB" according to the evaluation status model 47.

In this operating status, the second wire bonder 28 is idling. The signal lamps continue to show lighting of the green light of the second signal lamps 35. In the second exemplary embodiment, a number of semiconductor substrates are then transported from the machine arranged upstream of the second wire bonder 28 of the semiconductor production line into the second input buffer 30 of the second wire bonder 28. The second input buffer sensor 31 then registers that the second input buffer 30 is filled with a number of semiconductor substrates. It accordingly passes on the "free" status of the second input buffer 30. This brings about a status transition to the operating status of processing PR 58.

The amount of time of the time period in which the second wire bonder 28 has the operating status of processing PR 57 according to the interpretation status model is entered in the second exemplary embodiment into the time account of the corresponding main status of "production time PR" according to the evaluation status model 47.

In the operating status of processing PR 58, the second wire bonder 28 is working in the production process. At this point of the second exemplary embodiment, the second output buffer sensor 33 detects that the second output buffer 32 is full and cannot receive any further semiconductor substrates. Accordingly, a status transition into the operating status of idling blocked SB 60 takes place.

The amount of time of the time period in which the second wire bonder 28 has the operating status of idling blocked SB 60 according to the interpretation status model is entered in the second exemplary embodiment into the time account of the corresponding main status of "idling time SB" according to the evaluation status model 47.

In this operating status, the second wire bonder 28 is idling. The second signal lamps 35 continue to show lighting of the green light. According to the second exemplary embodiment, a number of the semiconductor substrates located in the second output buffer 32 are passed on to the machine arranged downstream of the second wire bonder 28 in the semiconductor production line. Accordingly, the second output buffer 32 of the second wire bonder 28 is no longer full. The second output buffer sensor 33 detects this automatically and indicates the event "free" of the second output buffer 32. This initiates a change in status into the operating status of processing PR 58.

The amount of time of the time period in which the second wire bonder 28 has the operating status of processing PR 57 according to the interpretation status model is entered in the second exemplary embodiment into the time account of the corresponding main status of "production time PR" according to the evaluation status model 47.

In the operating status of processing PR 58, the second wire bonder 28 is in productive operation. From this operating status, the operator switches the second wire bonder 28 into the operating status of idling SB 55. The machine control detects this and indicates it in the form of lighting the yellow light of the second signal lamps 35.

The amount of time of the time period in which the second wire bonder 28 has the operating status of idling SB 55 according to the interpretation status model is entered in the second exemplary embodiment into the time account of the corresponding main status of "idling time SB" according to the evaluation status model 47.

From the operating status of idling SB 55, the operator switches off the second wire bonder 28. The second signal lamps 35 are then in the "off" status.

A multitude of evaluations are then possible by means of the amounts of time entered into the time accounts of the evaluation statuses.

For instance, the overall time is obtained as the sum of the amounts of time entered into the time accounts of the main statuses of "test time EN", "idling time SB", "production time PR", "not-scheduled time NS", "scheduled standstill time SD" and "unscheduled standstill time UD" according to the evaluation status model 47.

For example, a characteristic productivity value can be calculated by the quotient of the amount of time entered into the time account of the main status of "production time PR" and the overall time.

What is claimed is:

1. In a production machine having at least one of a keypad, a switch array, a touchpad, a touch-sensitive screen, and a sensor, a method of using the at least one of a keypad, a switch array, a touch-sensitive screen, a sensor, and a machine control of the production machine, for generating events regarding production information while operating the production machine, which comprises the following steps:
  establishing an evaluation status model having a number of evaluation statuses, each of the evaluation statuses having precisely one corresponding time account;
  establishing an interpretation status model having statuses with transitions therebetween, the transitions of the interpretation status model being established in accordance with events detected on the production machine;
  assigning statuses of the interpretation status model to statuses of the evaluation status model;
  increasing a time account of one of the evaluation statuses applicable at a particular time while operating the production machine by an amount corresponding to a time period in which the production machine is in the evaluation status concerned; and generating events from signals generated by an operator with the at least one of the keypad, the switch array, the touch-sensitive screen, and the signal picked up by the sensor, and the signal picked up by the machine control.

2. The method according to claim 1, which further comprises determining a filling status of a buffer zone of the production machine with the sensor.

3. The method according to claim 1, which further comprises measuring pressure within the production machine with the sensor.

4. The method according to claim 1, which further comprises measuring work progress of the production machine with the indexer.

5. The method according to claim 1, wherein the machine control of the production machine is a plurality of signal lamps.

6. The method according to claim 1, wherein the production information is capacity utilization.

7. The method according to claim 1, wherein the production information is reliability of the production machine.

8. The method according to claim 1, which further comprises, during the establishing of the interpretation status model, establishing the transitions between the statuses of the interpretation status model in accordance with manual inputs of the operator of the production machine.

9. The method according to claim 8, which further comprises:

describing the manual inputs of the operator with a status model; and using the manual inputs as the events of the interpretation status model.

10. A method of using a sensor for generating events, which comprises:

operating a production machine according to the method of claim 1;

during the establishing of the interpretation status model, establishing transitions between the statuses of the interpretation status model in accordance with the signals of the sensor.

11. The method according to claim 10, which further comprises:

providing the production machine with a buffer zone having a filling status;

using a filling status sensor as the sensor; and determining the filling status of the buffer zone with the filling status sensor.

12. The method according to claim 11, which further comprises:

using a pressure sensor as the sensor;

measuring a pressure within the production machine with the pressure sensor.

13. The method according to claim 11, which further comprises:

providing the production machine with an indexer; and measuring work progress of the production machine with the indexer.

14. The method according to claim 11, wherein the signals assume discrete statuses; and describing the signals with the status model; and using the signals as the events of the interpretation status model.

15. A method of using a machine control of a production machine for generating events, which comprises:

providing the production machine with the machine control, the machine control having operating statuses;

operating the production machine according to the method according to claim 1;

during the establishing of the interpretation status model, establishing the transitions between the statuses of the interpretation status model in accordance with the operating statuses of the machine control of the production machine.

16. The method according to claim 15, which further comprises using signal lamps as the machine control of the production machine.

17. The method according to claim 15, which further comprises:

describing the operating statuses of the machine control of the production machine with a status model; and using the statuses as events of the interpretation status model.

18. The method according to claim 17, which further comprises using signal lamps as the machine control of the production machine.

* * * * *